United States Patent
Ness

(10) Patent No.: US 9,296,513 B2
(45) Date of Patent: *Mar. 29, 2016

(54) OFFSHORE CARGO RACK FOR USE IN TRANSFERRING LOADS BETWEEN A MARINE VESSEL AND AN OFFSHORE PLATFORM

(71) Applicant: Danny Ness, Metairie, LA (US)

(72) Inventor: Danny Ness, Metairie, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,009

(22) Filed: Nov. 3, 2014

(65) Prior Publication Data

US 2015/0114877 A1    Apr. 30, 2015

Related U.S. Application Data

(63) Continuation of application No. 13/312,547, filed on Dec. 6, 2011, now Pat. No. 8,875,894.

(60) Provisional application No. 61/420,155, filed on Dec. 6, 2010.

(51) Int. Cl.
*B65D 19/10* (2006.01)
*B65D 19/44* (2006.01)
(Continued)

(52) U.S. Cl.
CPC ............... *B65D 19/06* (2013.01); *B65D 19/10* (2013.01); *B65D 19/44* (2013.01);
(Continued)

(58) Field of Classification Search
CPC .... B65D 19/10; B65D 19/44; B65D 21/0215; B65D 25/04; B65D 25/10; B65D 25/22; B65D 2519/00273; B65D 2519/00512

USPC ............... 108/55.1, 55.3; 220/507, 553, 826; 206/386, 595, 598, 600

See application file for complete search history.

(56) References Cited

U.S. PATENT DOCUMENTS

| | | |
|---|---|---|
| 2,187,355 A | 1/1940 | MacManus |
| 2,579,655 A | 12/1951 | Donald |

(Continued)

*Primary Examiner* — Michael Safavi
(74) *Attorney, Agent, or Firm* — Garvey, Smith, Nehrbass & North, L.L.C.; Charles C. Garvey, Jr.; Vanessa M. D'Souza

(57) ABSTRACT

A cargo rack for transferring loads between a marine vessel and an offshore marine platform (for example, oil and gas well drilling or production platform) provides a frame having a front, a rear, and upper and lower end portions. The lower end of the frame has a perimeter beam base, a raised floor and a pair of open-ended parallel fork tine tubes or sockets that communicate with the perimeter beam at the front and rear of the frame, preferably being structurally connected (e.g., welded) thereto. Openings in the perimeter beam base align with the forklift tine tubes or sockets. The frame includes a plurality of fixed side walls extending upwardly from the perimeter beam that include at least left and right side walls. A plurality of gates are movably mounted on the frame including a gate at least at the front and at least at the rear of the frame, each gate being movable between open and closed positions, the gates enabling a forklift to place loads on the floor by accessing either the front of the frame or the rear of the frame. Each gate can be pivotally attached to a fixed side wall. The frame has vertically extending positioning beams or lugs that segment the raised floor into a plurality of load-holding positions. Each load holding position has a plurality of positioning beams or lugs that laterally hold a load module (e.g., palletized load) in position once a load is placed on the raised floor.

18 Claims, 14 Drawing Sheets

(51) Int. Cl.

| | | |
|---|---|---|
| *B65D 21/032* | (2006.01) | |
| *B65D 25/04* | (2006.01) | |
| *B65D 25/10* | (2006.01) | |
| *B65D 25/22* | (2006.01) | |
| *B65D 19/06* | (2006.01) | |
| *B65D 21/02* | (2006.01) | |
| *B65G 1/02* | (2006.01) | |
| *B65D 25/00* | (2006.01) | |

(52) U.S. Cl.
CPC ......... *B65D 21/0215* (2013.01); *B65D 25/005* (2013.01); *B65D 25/04* (2013.01); *B65D 25/10* (2013.01); *B65D 25/22* (2013.01); *B65G 1/02* (2013.01); *B65D 2519/00273* (2013.01); *B65D 2519/00512* (2013.01); *B65D 2519/00532* (2013.01); *B65D 2519/00791* (2013.01)

(56) References Cited

U.S. PATENT DOCUMENTS

| | | | |
|---|---|---|---|
| 2,683,010 A | 7/1954 | Hamerslag, Jr. | |
| 2,692,064 A | 10/1954 | Koester | |
| 3,776,435 A | 12/1973 | Smith | |
| 3,916,803 A | 11/1975 | Garcia | |
| 4,165,806 A | 8/1979 | Cayton | |
| 4,295,431 A | 10/1981 | Stavlo | |
| 4,403,556 A | 9/1983 | Van Gompel | |
| 4,491,076 A | 1/1985 | Forshee | |
| 4,828,311 A | 5/1989 | Hayashi | |
| 5,000,372 A | 3/1991 | Hollander et al. | |
| 5,078,415 A | 1/1992 | Goral | |
| 5,156,233 A | 10/1992 | Olsen et al. | |
| 5,269,455 A | 12/1993 | Grigsby et al. | |
| 5,292,012 A | 3/1994 | Davis et al. | |
| 5,450,961 A | 9/1995 | Gottfried et al. | |
| 5,501,333 A | 3/1996 | Swan | |
| 5,507,237 A | 4/1996 | Barrow et al. | |
| 5,829,595 A | 11/1998 | Brown et al. | |
| 5,906,165 A | 5/1999 | McCorkle, Jr. et al. | |
| 6,058,852 A | 5/2000 | Estvanko | |
| 6,076,690 A | 6/2000 | Hemmerly | |
| 6,357,365 B1 | 3/2002 | Higgins et al. | |
| 6,371,299 B1 | 4/2002 | Essary | |
| 6,422,405 B1 | 7/2002 | Haenszel | |
| 6,450,330 B1 | 9/2002 | Cannata | |
| 6,668,735 B2 | 12/2003 | Cassina | |
| 6,725,783 B2 | 4/2004 | Sekino | |
| 6,983,704 B1 | 1/2006 | Ness | |
| 7,997,213 B1 | 8/2011 | Gauthier et al. | |
| 7,997,441 B2 | 8/2011 | Marcel | |
| 8,276,753 B2 | 10/2012 | Garcia De Alba | |
| 8,469,191 B2 | 6/2013 | Steinhoff et al. | |
| 8,875,894 B2 | 11/2014 | Ness | |
| 2004/0188433 A1 | 9/2004 | Morales et al. | |
| 2006/0102517 A1 | 5/2006 | Chen | |
| 2007/0102315 A1 | 5/2007 | Garcia De Alba | |
| 2009/0241809 A1 | 10/2009 | Head | |
| 2009/0272666 A1 | 11/2009 | Marcel | |
| 2010/0178126 A1 | 7/2010 | Ness | |

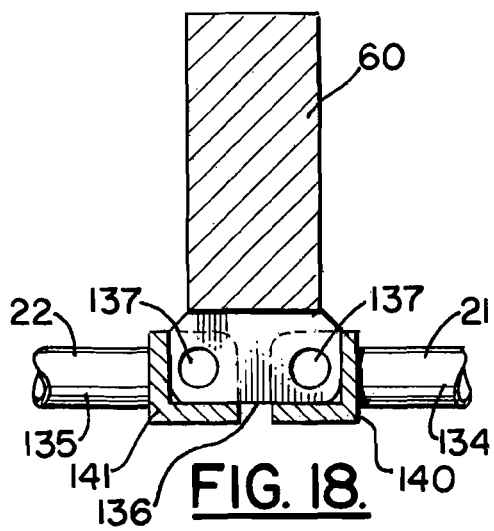
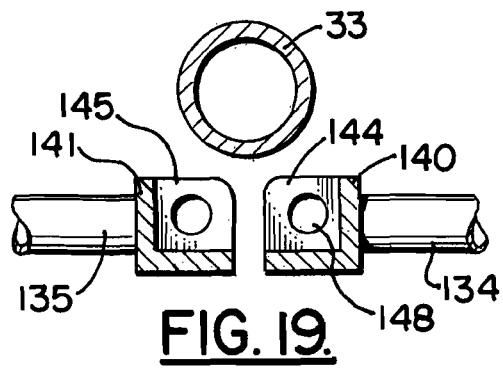
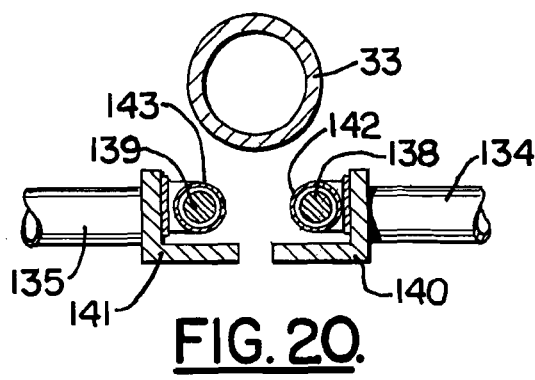
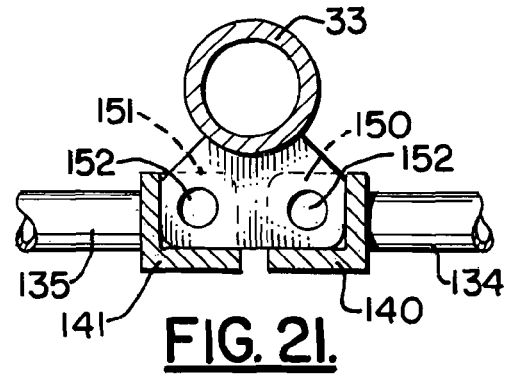
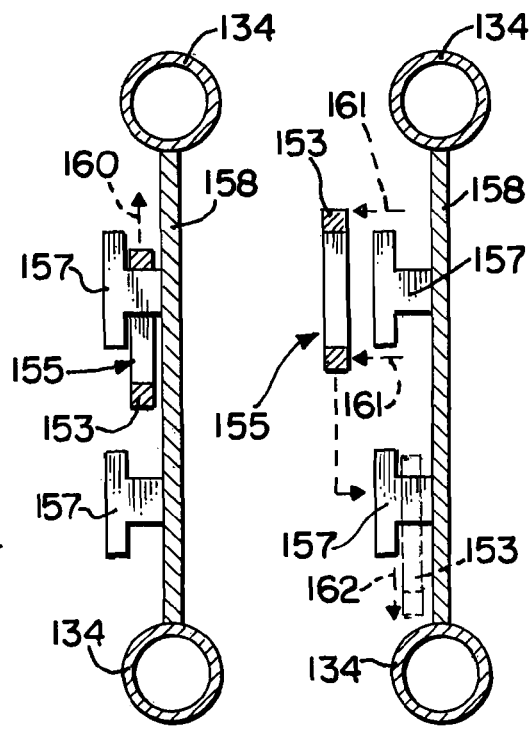

OFFSHORE CARGO RACK FOR USE IN TRANSFERRING LOADS BETWEEN A MARINE VESSEL AND AN OFFSHORE PLATFORM

CROSS-REFERENCE TO RELATED APPLICATIONS

This is a continuation of U.S. patent application Ser. No. 13/312,547, filed 6 Dec. 2011 (issued as U.S. Pat. No. 8,875, 894 on Nov. 4, 2014), which claims benefit of U.S. Provisional Patent Application Ser. No. 61/420,155, filed 6 Dec. 2010, which is hereby incorporated herein by reference, priority of each of which is hereby claimed.

Priority of U.S. Provisional Patent Application Ser. No. 61/420,155, filed 6 Dec. 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cargo racks for transferring goods between marine vessels and offshore platforms such as oil and gas well drilling and production platforms. More particularly, the present invention relates to an improved cargo rack that enables a user to load the rack with multiple load modules (e.g. fluid containing vessels or tanks), palletized loads, bulk bags (or other loads) and to then transport the entire rack using a lifting device such as a crane or a forklift from one locale (e.g. marine vessel) to another locale (e.g. marine platform). Additionally, the entire rack can be moved on land or on the platform with a crane or forklift. When supporting fluid holding vessels or tanks, a specially configured manifold can be used to empty a particular or selected tank or vessel. Lifting fittings are placed at the top of intermediate columns and inner reinforcement members (e.g. inner braces or walls) transfer load from one intermediate column to another intermediate column.

2. General Background

In the exploration of oil and gas in a marine environment, fixed, semi submersible, jack up, and other offshore marine platforms are used during drilling operations. Fixed platforms are typically used for production of oil and gas from wells after they have been drilled. Drilling and production require that an enormous amount of supplies be transported from land based storage facilities. Supplies are typically transferred to offshore platforms using very large marine vessels called work boats. These work boats can be in excess of one hundred feet (30.48 meters) in length and have expansive deck areas for carrying cargo that is destined for an offshore platform. Supplies are typically transferred from a land based dock area to the marine vessel using a lifting device such as a crane or a mobile lifting and transport device such as a forklift.

Once a work boat arrives at a selected offshore platform, supplies or products are typically transferred from the deck of the work boat to the platform using a lifting device such as a crane.

Once on the deck of a drilling platform or production platform, space is at a premium. The storage of supplies on an offshore oil well drilling or production platform is a huge problem.

Many cargo transport and lifting devices have been patented. The table below lists some patents that relate generally to pallets, palletized racks, and other cargo racks.

TABLE 1

| PAT. NO. | TITLE | ISSUE DATE (MM/DD/YYYY) |
| --- | --- | --- |
| 2,579,655 | Collapsible Container | Dec. 25, 1951 |
| 2,683,010 | Pallet and Spacer | Jul. 06, 1954 |
| 3,776,435 | Pallet | Dec. 04, 1973 |
| 3,916,803 | Loading Platform | Nov. 04, 1975 |
| 4,165,806 | Palletizing System for Produce Cartons and the Like | Aug. 28, 1979 |
| 4,403,556 | Drum Retainer | Sep. 13, 1983 |
| 4,828,311 | Metal Form Pallet | May 09, 1989 |
| 5,078,415 | Mobile Carrier for Gas Cylinders | Jan. 07, 1992 |
| 5,156,233 | Safety Anchor for Use with Slotted Beams | Oct. 20, 1992 |
| 5,292,012 | Tank Handling and Protection Structure | Mar. 08, 1994 |
| 5,507,237 | Lifting Apparatus for Use with Bulk Bags | Apr. 16, 1996 |
| 5,906,165 | Stackable Tray for Plants | May 25, 1999 |
| 6,058,852 | Equipment Skid | May 09, 2000 |
| 6,357,365 | Intermediate Bulk Container Lifting Rack | May 19, 2002 |
| 6,371,299 | Crate Assembly and Improved Method | Apr. 16, 2002 |
| 6,422,405 | Adjustable Dunnage Rack | Jul. 23, 2002 |
| 6,668,735 | Pallet with a Plastic Platform | Dec. 30, 2003 |
| 6,725,783 | Pallet for Stacking Planographic Printing Plates Thereon | Apr. 27, 2004 |

BRIEF SUMMARY OF THE INVENTION

The present invention provides a cargo rack having a frame with front, rear, and upper and lower end portions;

The lower end portion of the frame provides a base with a floor providing multiple load holding positions, each configured to hold a separate load module.

A plurality of load modules are supported with the frame during use.

The frame includes a plurality of side walls that attach to and extend upwardly from the perimeter beam base and including at least left and right side walls, the frame having four corners with a corner column at each corner.

At least one intermediate column is positioned in between two corner columns.

A plurality of gates are movably mounted to the frame, including a pair of gates at the front and a pair of gates at the rear of the frame, each gate being movably mounted to the frame between open and closed positions, each gate spanning in a horizontal direction from a corner column to an intermediate column.

A plurality of lifting eyes are attached to the upper end port of the frame, each lifting eye attached to the frame next to an intermediate column.

Inner walls or braces separate the base into the load holding positions, the inner walls spanning between intermediate columns to define a transverse support that is generally aligned with a pair of lifting eyes.

In one embodiment, there are four load holding positions.

In one embodiment, there are a pair of gates at the front of the frame.

In one embodiment, there are a pair of gates at the rear of the frame.

In one embodiment, at least a part of the floor is inclined.

In one embodiment, the floor attaches to an upper end portion of the perimeter beam.

In one embodiment, there is a drain opening in the floor.

In one embodiment, the floor attaches to an upper end portion of the perimeter beam.

In one embodiment, clamps are movably attached to the upper end of the frame between clamping and release positions for restraining vertical movement of a load that is placed on the floor.

In one embodiment, raised portions or pedestals extend above the raised floor for providing a level surface to engage a load placed on a load holding position of the frame.

In one embodiment, the cargo rack provides a frame having a perimeter, a front, a rear, and upper and lower end portions.

The frame includes a plurality of side walls extending upwardly from the frame perimeter and including at least left and right side walls, four corners that each provide a corner column and an intermediate column at the front and rear of the frame in between the corner columns.

A plurality of gates are movably mounted to the frame, including a pair of gates at the front of the frame and a pair of gates at the rear of the frame, each gate being movable between open and closed positions, each gate extending between a corner column and an intermediate column.

The frame has a raised floor that provides a plurality of load holding positions.

Another embodiment provides a cargo rack having a frame with a floor, a front, a rear and upper and lower end portions.

A plurality of load modules are supported within the frame and upon the floor during use.

The frame includes a plurality of side walls extending upwardly from the perimeter beam and including at least left and right side walls, the frame having four corners and a corner column at each corner.

A plurality of gates are movably mounted on the frame, including a pair of gates at the front of the frame and a pair of gates at the rear of the frame, each gate being movable between open and closed positions, the gates enabling the load modules to be loaded laterally to the floor by accessing either the front or the rear of the frame.

The frame has positioning beams that segment the floor into a plurality of load holding positions, each having positioning beams that laterally hold one of the load modules in position once a load module is placed on the floor and in a load holding position.

The gates expose a majority of the width of the floor for loading a tank to a selected load holding position on the floor, either at the front or at the rear of the frame when the gates are opened.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 18-23 are fragmentary views illustrating details of the gates and gate closures.

DETAILED DESCRIPTION OF THE INVENTION

Figure 1:
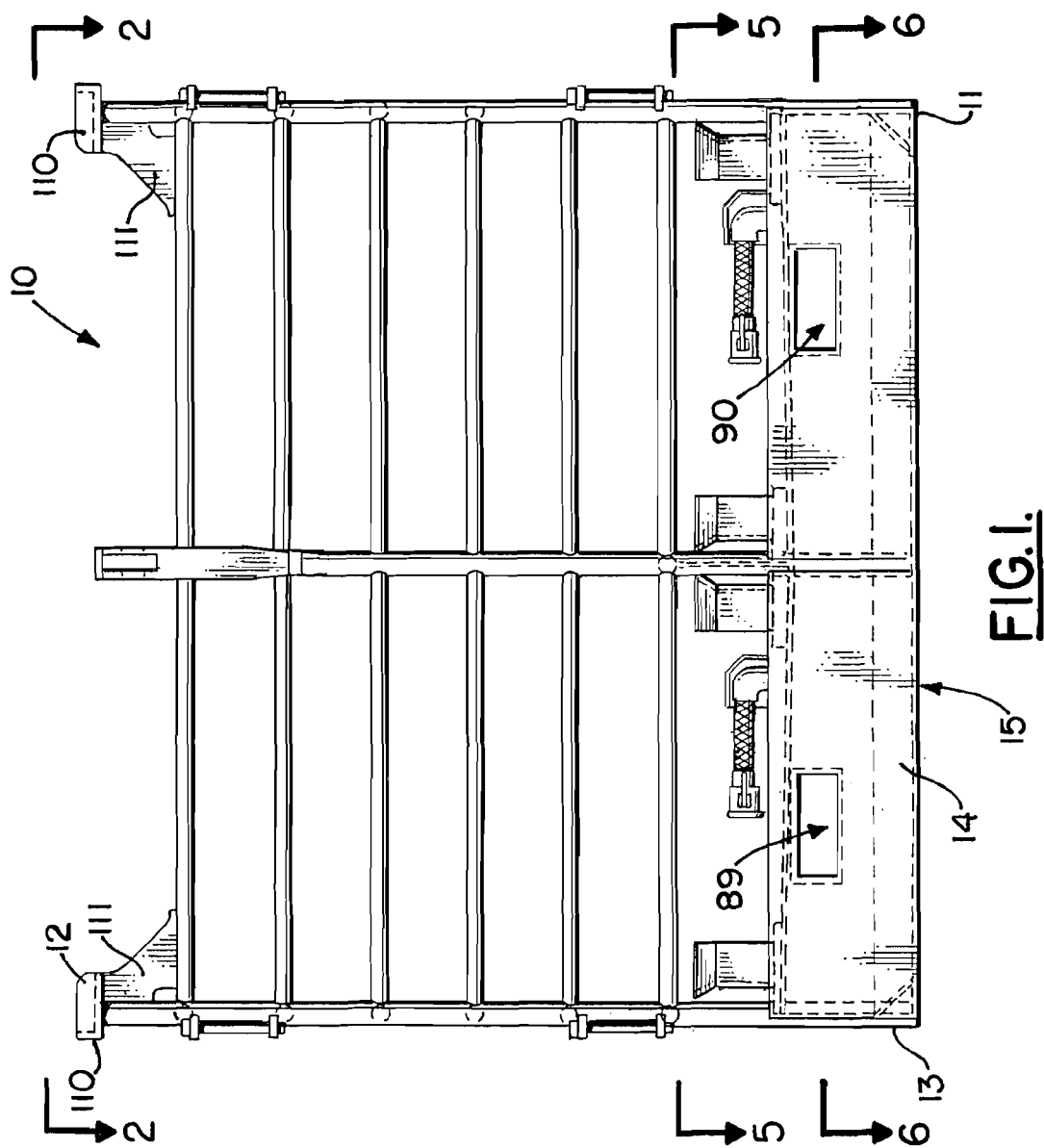
FIG. 1 is an elevation view of a preferred embodiment of the apparatus of the present invention.

FIGS. 1-23 show a preferred embodiment of the apparatus of the present invention designated generally by the numeral 10. The preferred embodiment 10 provides a transportable cargo rack that is configured to hold multiple cargo modules or tanks 105.

Cargo rack 10 provides a frame 11 having an upper end portion 12 and a lower end portion 13. The lower end portion 13 includes a base 14. Base 14 can provide a bottom 15 configured to rest upon an underlying support surface such as a floor 16.

Base 14 floor 16 is divided into a number of floor segments or quadrants 17, 18, 19, 20. Each floor segment or quadrant 17-20 can contain a load module or tank 105. This arrangement can be seen in FIG. 11 wherein four floor segments or quadrants 17-20 are provided, each being occupied by a tank or load module 105.

Figure 2:
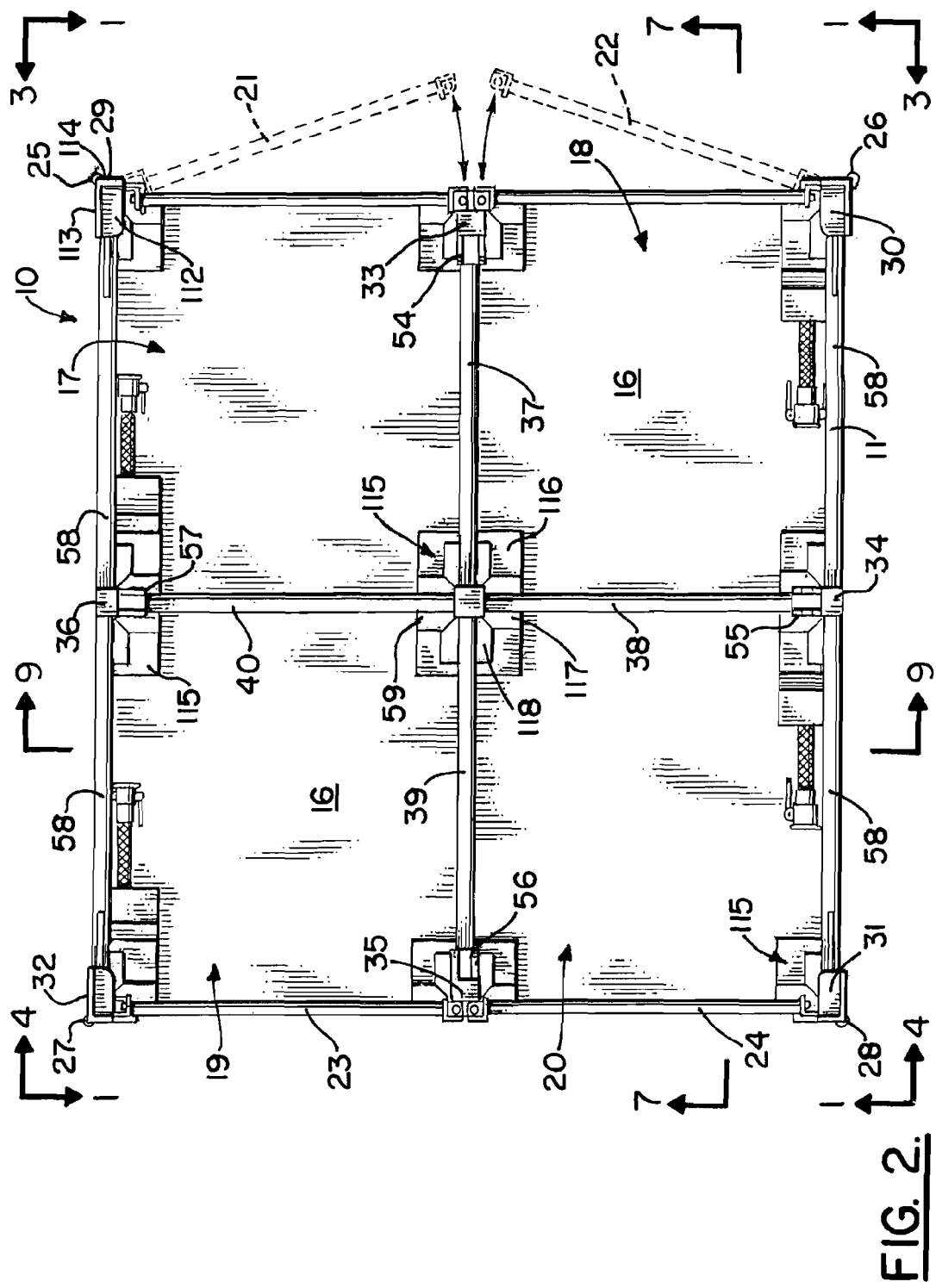
FIG. 2 is a top, plan view of a preferred embodiment of the apparatus of the present invention taken along lines 2-2 of FIG. 1.
Figure 3:
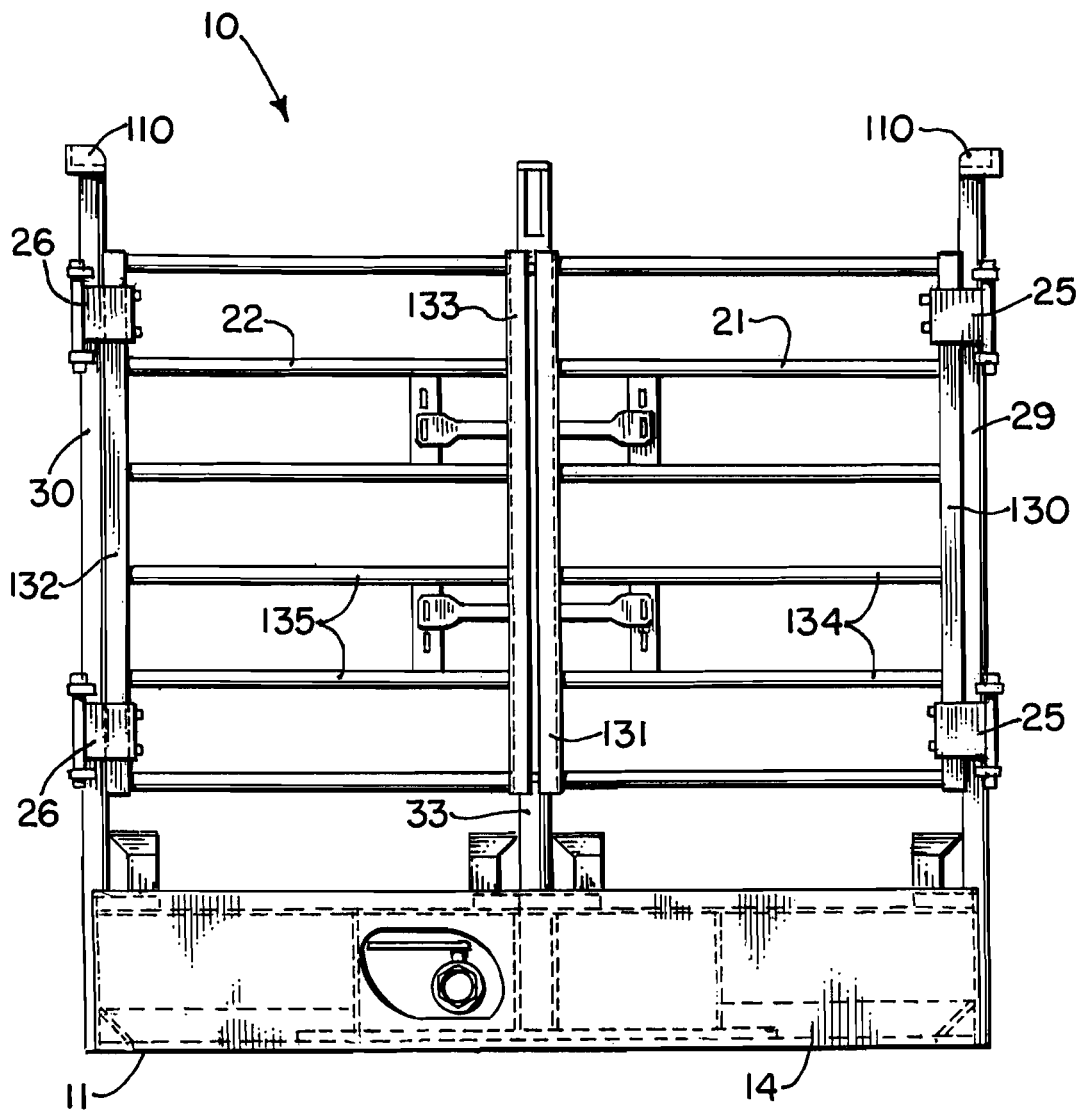
FIG. 3 is an end view of a preferred embodiment of the apparatus of the present invention taken along lines 3-3 of FIG. 2.
Figure 4:
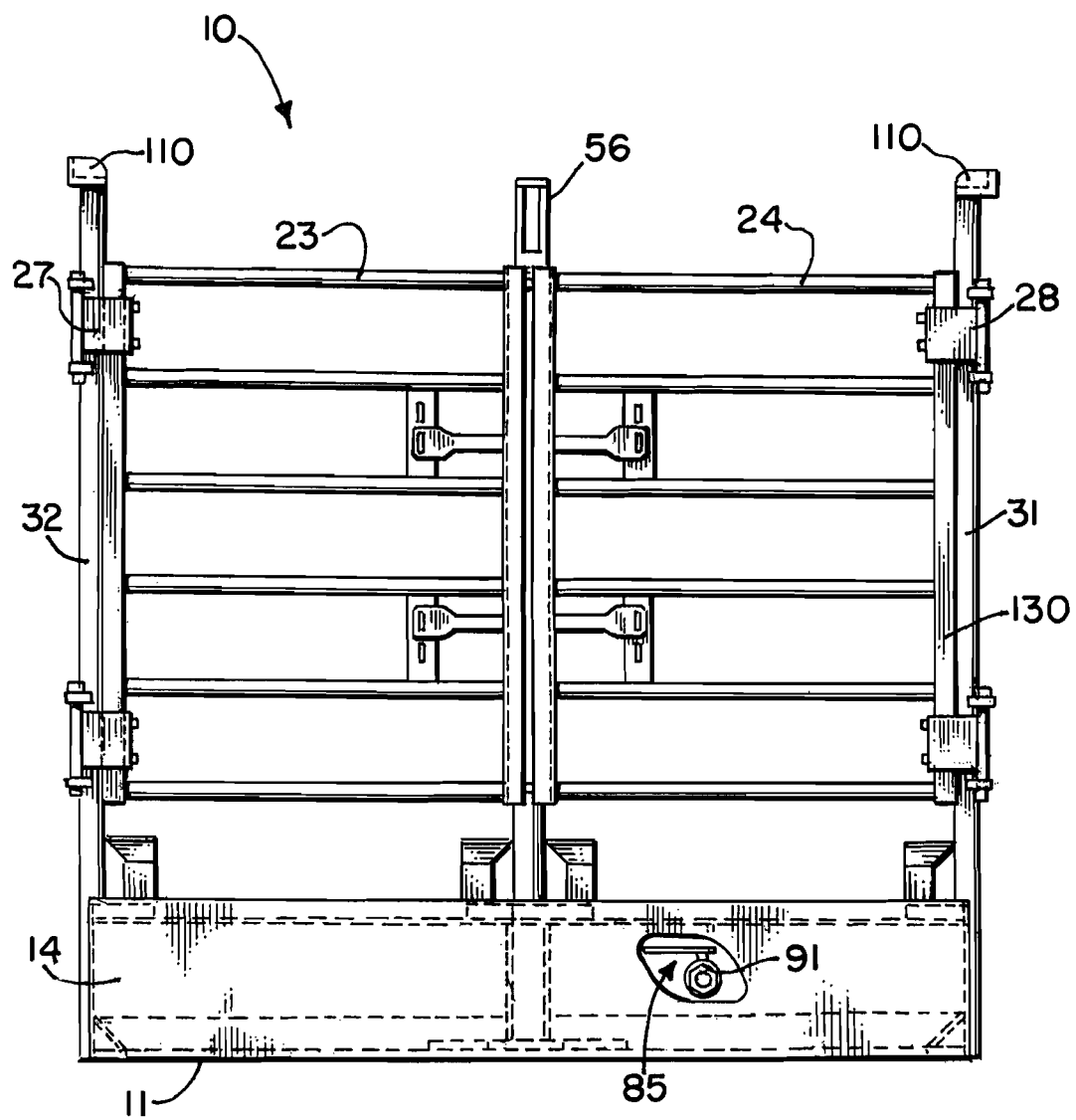
FIG. 4 is an end view of a preferred embodiment of the apparatus of the present invention, taken along lines 4-4 of FIG. 2.
Figure 5:
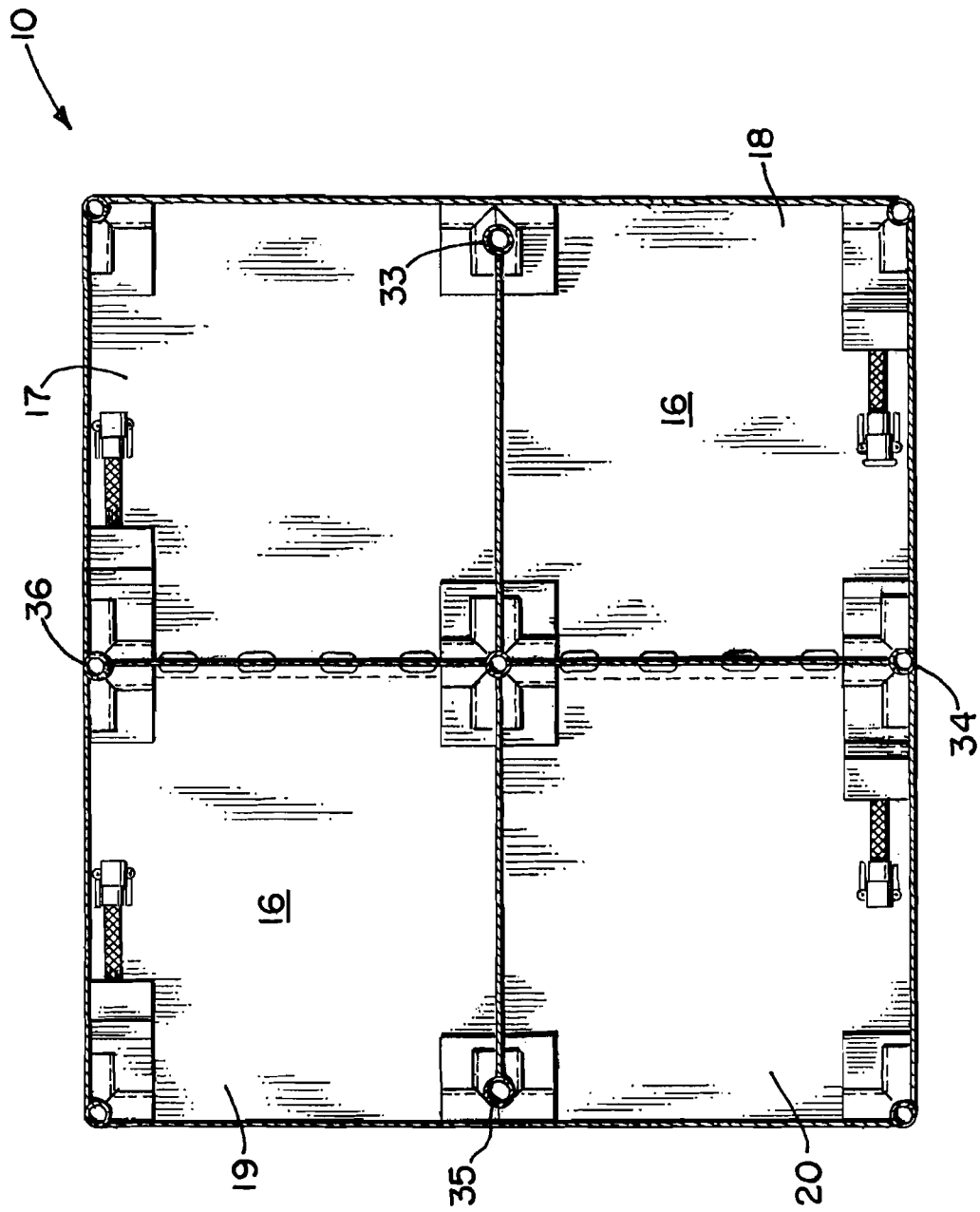
FIG. 5 is a sectional view taken along lines 5-5 of FIG. 1.

Frame 11 has sidewalls or gates or doors. In a preferred embodiment, there are four doors 21, 22, 23, 24. The doors 21-24 are arranged in pairs. As shown in FIG. 2, there are a pair of doors 21, 22 at one end portion of frame 11. There are another pair of doors 23, 24 at the opposing end portion of the frame 11, positioned generally opposite doors 21, 22 as shown in FIG. 2.

Each door 21-24 is movably (e.g. hingedly) attached to frame 11. Hinges 25, 26, 27, 28 are provided. The door 21 attaches to frame 11 at hinges 25. The door 22 attaches to frame 11 at hinges 26. Similarly, door 23 attaches to frame 11 at hinges 27. Door 24 attaches to frame 11 at hinges 28.

Each of the hinges 25-28 is attached to a corner column. There are four corner columns 29, 30, 31, 32. Frame 11 also provides a plurality of intermediate columns. There is an intermediate column in between each pair of corner columns 29-32. Upper interior horizontal supports 37-40 form a connection between each intermediate column 33-36 and a central column 41. Diagonal supports 42-45 are also provided, each diagonal support 42-45 extending between the central column 41 and an intermediate 33-36 (see FIGS. 7 and 9).

Figure 7:
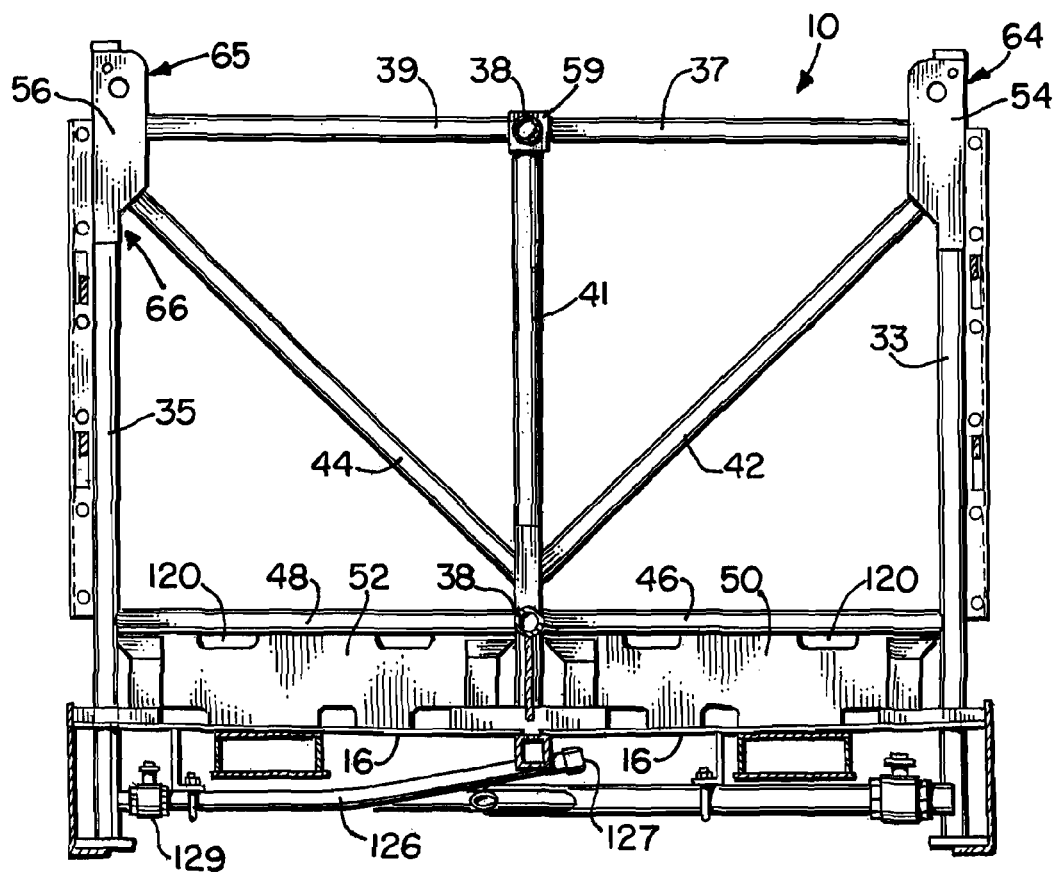
FIG. 7 is a sectional view of a preferred embodiment of the apparatus of the present invention, taken along lines 7-7 of FIG. 2.
Figure 9:
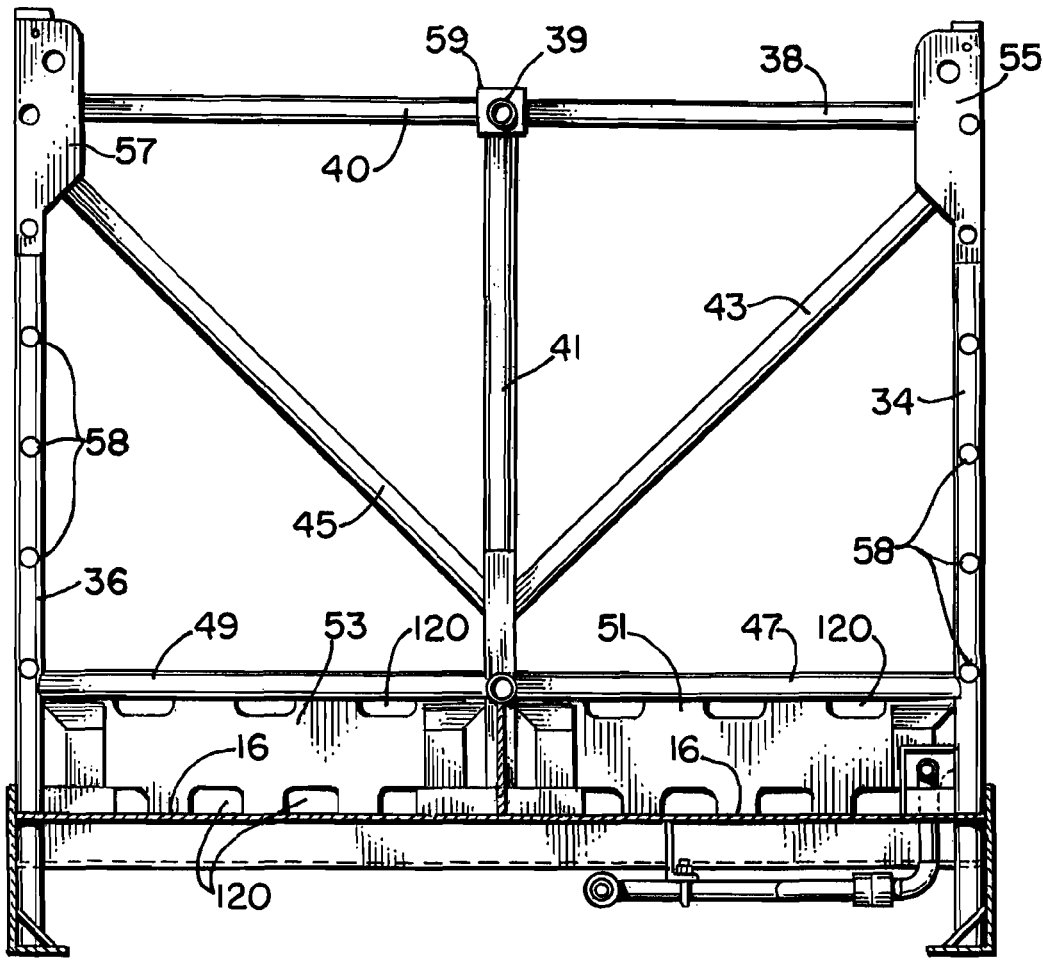
FIG. 9 is an end view of a preferred embodiment of the apparatus of the present invention.

Lower horizontal supports 46, 47, 48, 49 are provide, each extending between the central column 41 and an intermediate column 33-36. Each lower horizontal support 46-49 can be positioned below the diagonal supports 42-45 as shown in FIGS. 7 and 9. Thus, interior walls are provided that extend between each intermediate column 33-36 and the central column 41. Each wall or divider can be comprised of an upper interior horizontal support 37-40, a diagonal support 42-45, a lower interior horizontal support 46-49 and a plate section 50-53.

Plate sections 50, 51, 52, 53 extend between floor 16 and a lower horizontal support 46, 47, 48 or 49. Each plate section 50-53 can have openings 120 for enabling easy cleanup or wash down. In FIG. 7, the plate section 50 extends between floor 16 and lower horizontal support 46. Plate section 52 extends between floor 16 and lower horizontal support 48. Each of the plate sections 50-53 can be provided with openings or slots 120 that enable fluid to travel from one floor segment or quadrant 17, 18, 19, 20 to another floor segment or quadrant 17, 18, 19, 20 such as might occur during washing of the apparatus 10.

Four lifting assemblies 54, 55, 56, 57 are provided. Each lifting assembly (see FIGS. 12, 13) is attached to an upper end portion of an intermediate column 33, 34, 35, 36. Peripheral horizontal members 58 span between each intermediate column 34, 36 and a corner column 29, 30, 31, 32. Upper central fitting 59 can be in the form of a block that is receptive of and forms a connection (for example, welded) with central column 41 and each of the upper interior horizontal supports 37, 38, 39, 40 as shown in FIGS. 2 and 7.

Figure 12:
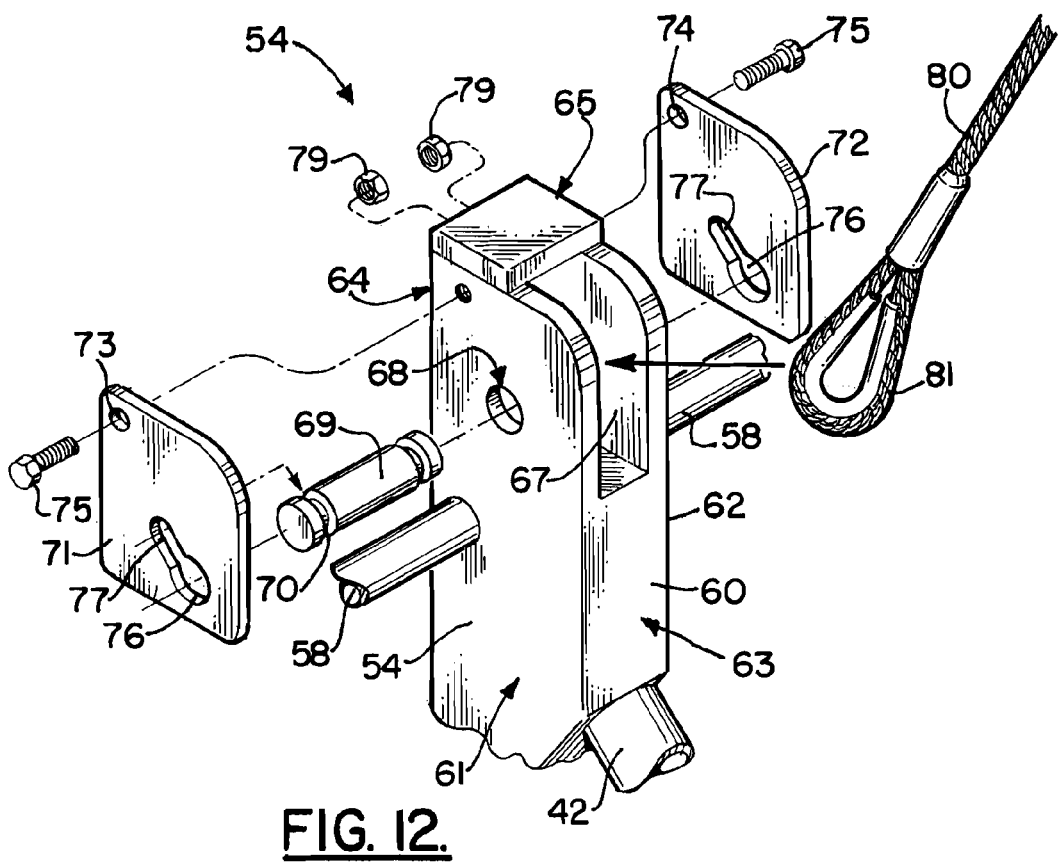
FIG. 12 is a fragmentary perspective view of a preferred embodiment of the apparatus of the present invention.
Figure 13:
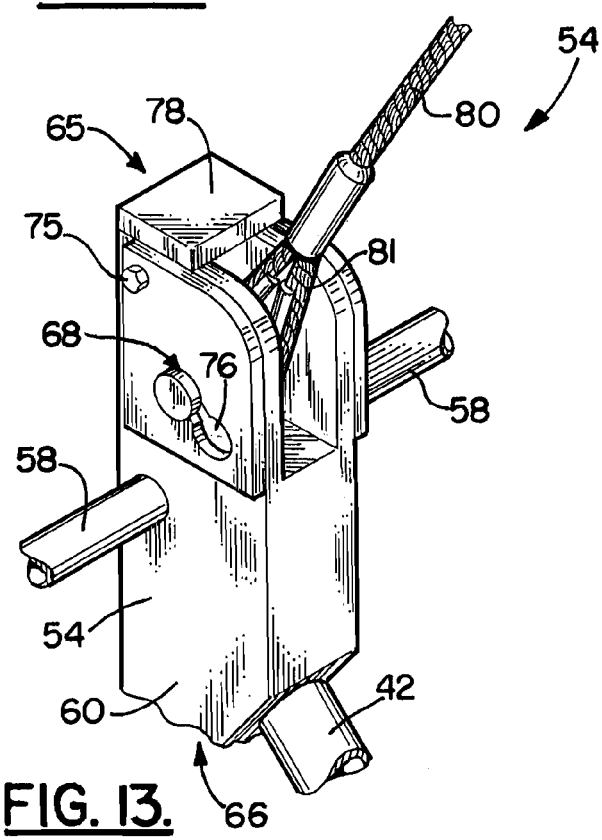
FIG. 13 is a fragmentary perspective view.
Figure 14:
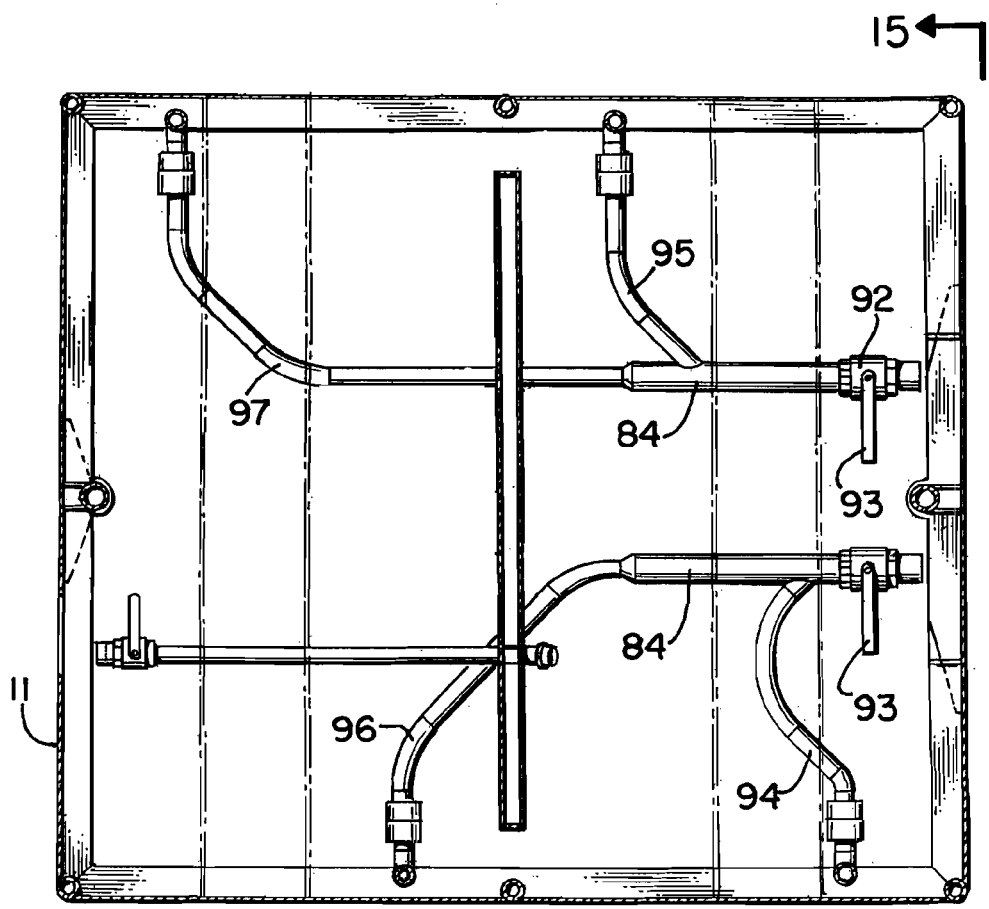
FIG. 14 is a sectional view showing an alternate manifold arrangement.
Figure 15:
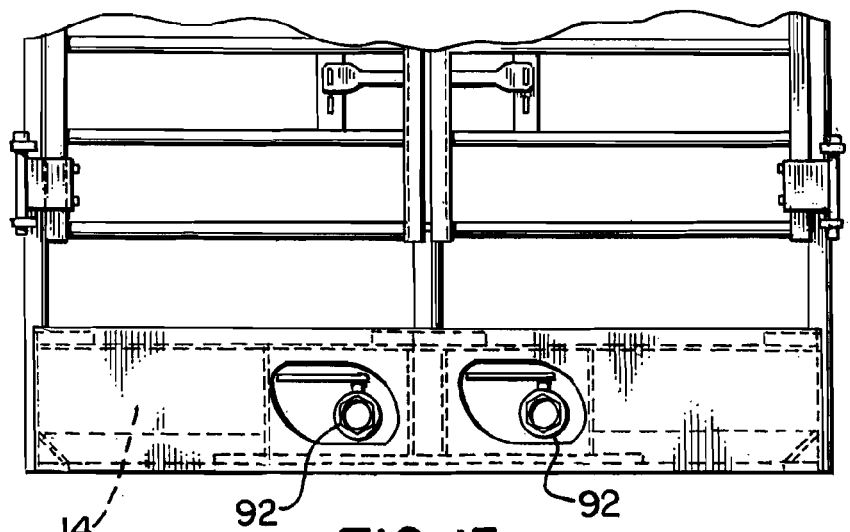
FIG. 15 is a sectional view taken along lines 15-15 of FIG. 14.

In FIGS. 12 and 13, each lifting assembly 54, 55, 56, 57 provides a lifting block or body 60. While one of the lifting assemblies 54 as shown in FIGS. 12 and 13, it should be understood that each of the lifting assemblies 55, 56, 57 can be of the same configuration as shown in FIGS. 12 and 13 for the lifting assembly 54. Lifting block or body 60 has side surfaces 61, 62, front surface 63, and rear surface 64. The lifting block or body 60 has an upper end portion 65 and a lower end portion 66. Upper end portion 65 provides a recess or slot 67 that enables attachment of a lifting sling 80 to the block or body 60 using pin 69 as shown. Openings 68 are provided in block or body 60 extending between each side surface 61, 62 and the recess or slot 67. Pin 69 spans between the openings 68 when the apparatus is to be lifted using slings or lift lines 80. Pin 69 has annular grooves 70 that each interlock with a plate 71 or 72. Each plate 71, 72 has an opening 73 or 74. Similarly sized and shaped openings are provided on body or block 60 so that a bolted connection can be formed using bolt 75 and a nut 79 as shown in FIGS. 12 and 13.

The annular grooves 70 of pin 69 register in slots 77 end plates 71, 72 as shown in FIG. 12. Each of the slots 77 communicates with a circular opening 76 that is slightly larger than the diameter of the pin 69. In this fashion, the pin 69 can pass through the openings 76 of the plates 71, 72. The pin 69 is too large to occupy the recess or slot 77. However, each annular groove 70 at an end portion of the pin 69 is sized and shaped to enable the pin 69 to interlock with the plates 71, 72. The annual grooves 70 enable this fit of pin 69 to the plate 71 or 72 at the slot 77 as shown in FIG. 13.

Figure 11:
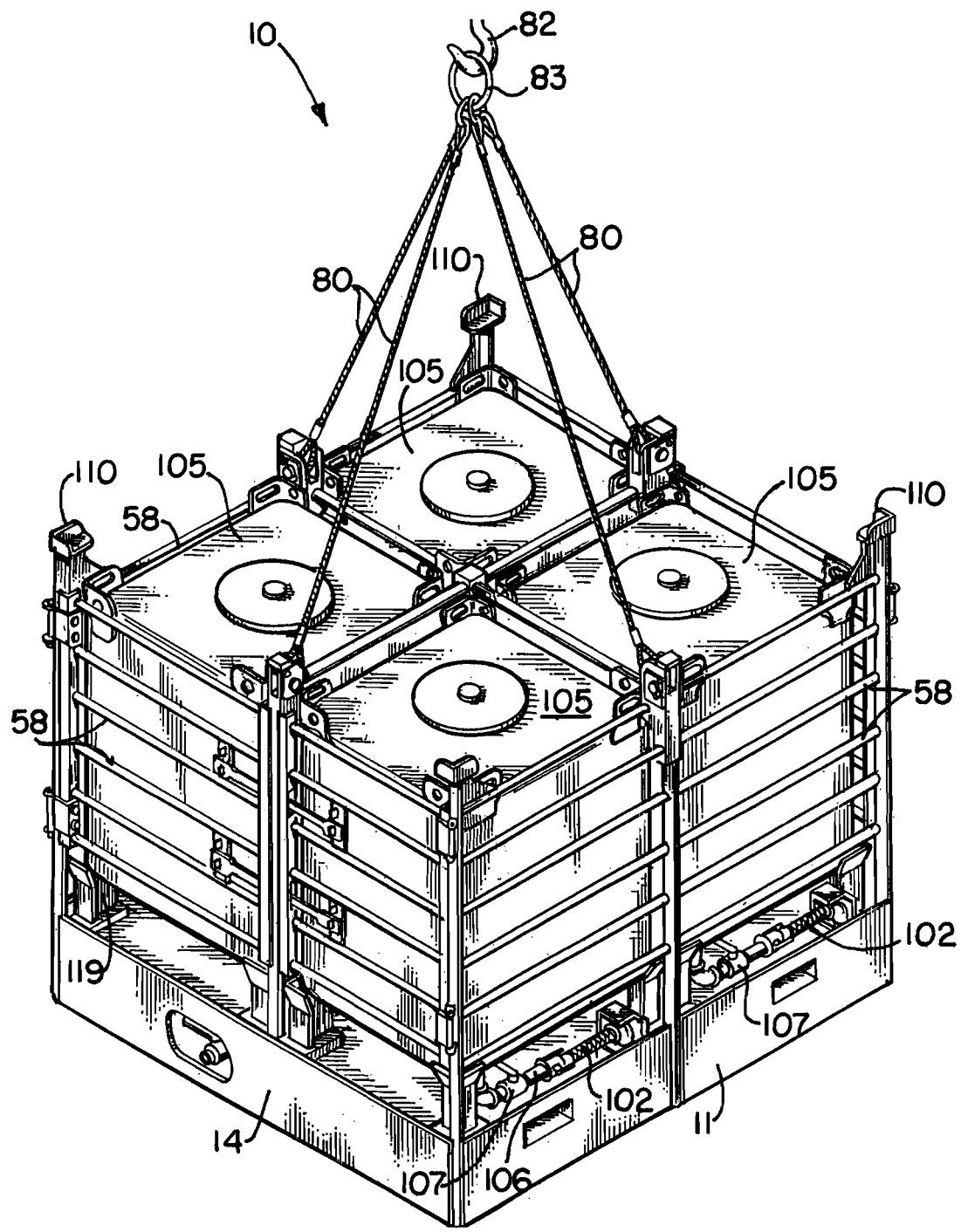
FIG. 11 is a perspective view of a preferred embodiment of the apparatus of the present invention.
Figure 16:
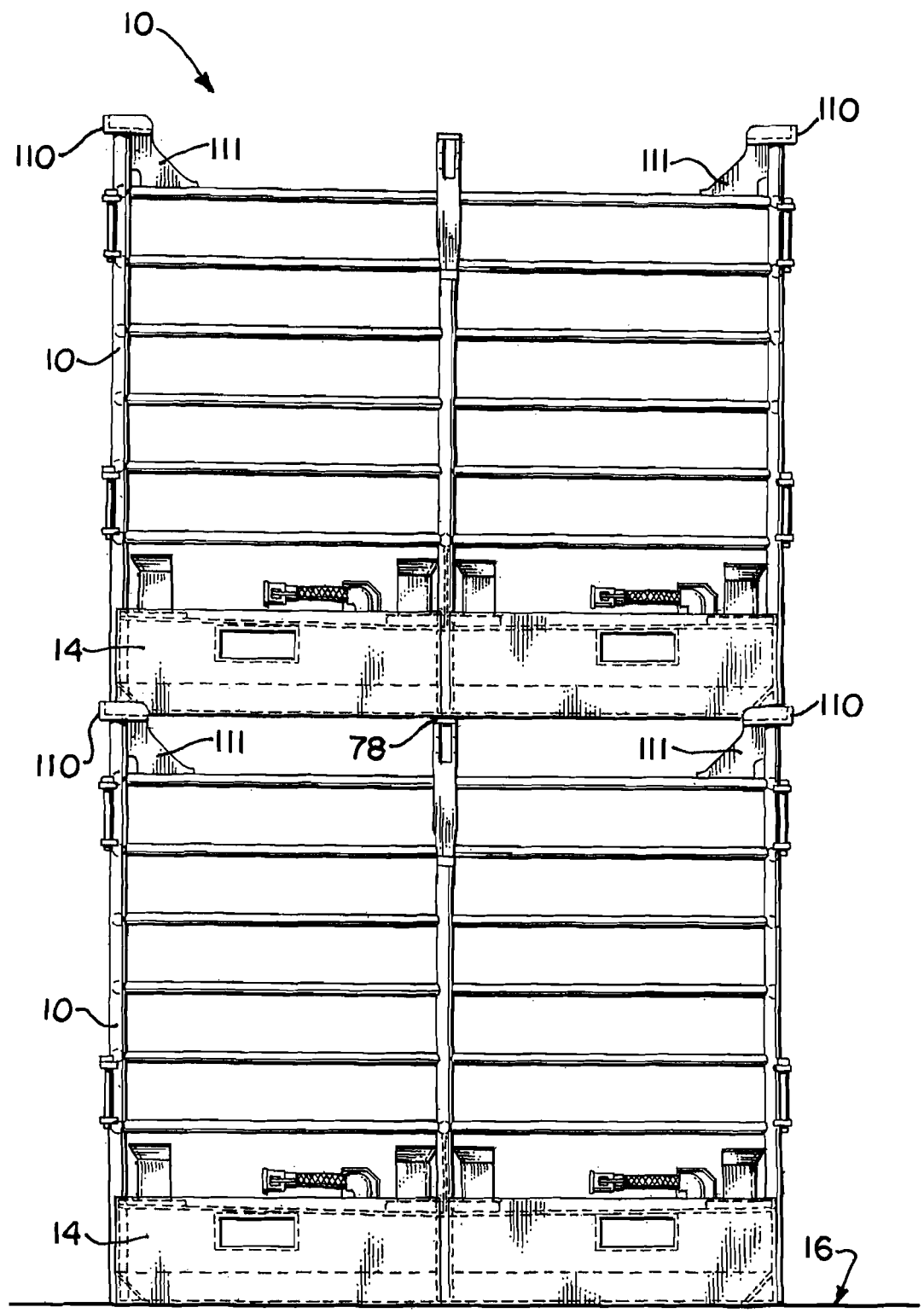
FIG. 16 is an elevation view illustrating a stacking of two cargo racks.

A cover plate 78 can be placed over the block or body 60, the plate 78 being receptive of the bottom 15 of another rack 10 when they are stacked upon one another as shown in FIG. 16. A lifting line or sling 80 has an eyelet 81 which can be rigged to the pin 69 as shown in FIG. 13. When a crane or other implement lifts upwardly on the slings 80, each sling 80 eyelet 81 transfers load to the pin 69 and thus to the lifting assembly 54, 55, 56, 57 and thus to the frame 11. FIG. 11 illustrates a lifting implement or hook or crown block 82 that is commonly employed in combination with a lifting device such as a crane. Other lifting fitting such as a ring or shackle 83 can be employed as an interface between the slings 80 and the lifting implement 82.

Figure 6:
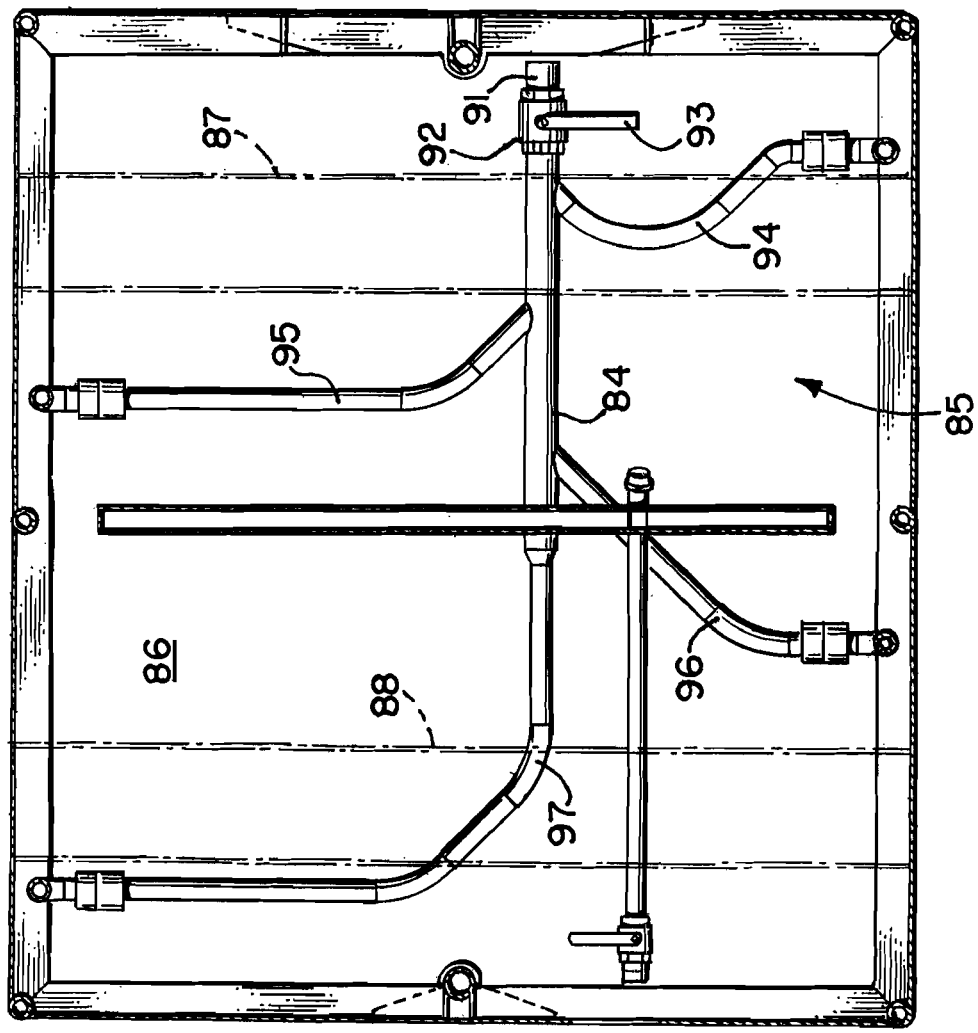
FIG. 6 is a sectional view of a preferred embodiment of the apparatus of the present invention, taken along lines 6-6 of FIG. 1.

FIG. 6 illustrates a manifold or header 84 that can be used to transfer fluid from any one of the load modules or tanks 105 and a discharge or outlet fitting or coupling 91. Header or manifold 84 is contained within base 11 interior 85. The base 11 has a bottom panel 86. A pair of beams or channels 87, 88 extend through base 11, each providing an opening or bore 89, 90 that is receptive of a forklift tine. In this fashion, the frame 11 can be lifted using a forklift by engaging the forklift tines in the bores 89, 90 of the beams or channels 87, 88.

Figure 10:
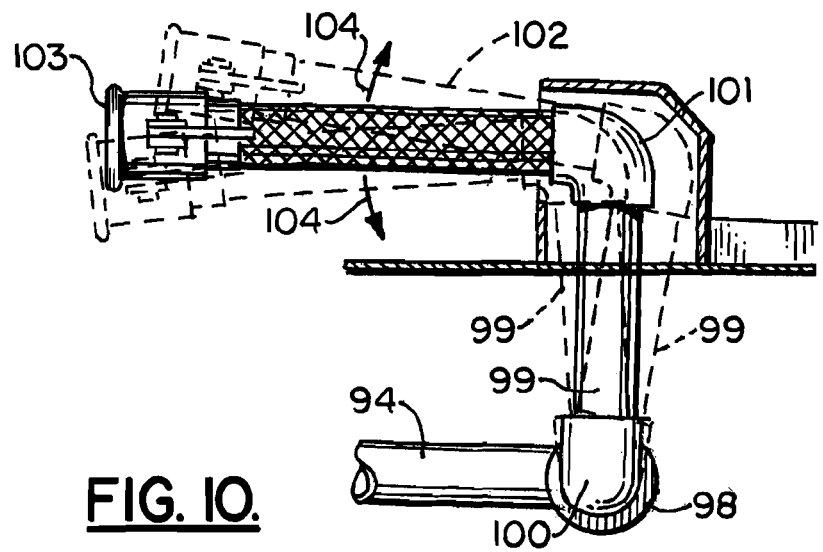
FIG. 10 is a fragmentary view of a preferred embodiment of the apparatus of the present invention.

Valve 92 having valve handle 93 can be placed immediately upstream of discharge of outlet fitting or coupling 91. Header 84 communicates with valve 92. A plurality of four flow lines 94, 95, 96, 97 empty their contents into header 84 as shown in FIG. 6. Each of the flow lines 94, 95, 96, 97 attaches to a different one of the tanks or modules 105. A detail of the fluid connection between a tank or module 105 and header 85 can be seen in FIG. 10. FIG. 10 illustrates the connection of a single flow line 94 to a tank 105. It should be understood that each of the flow lines 94, 95, 96, 97 can be similarly connected to a tank or module.

Flow line 94 connects to swivel 98. The swivel 98 connects to a riser 99 at elbow fitting 100. Another elbow fitting 101 connects to hose section 102. Hose section 102 is provided with a quick connect fitting 103 that forms a quick connect with a flow line 106 that exits the tank or module 105. This connected position can be seen in FIG. 11. In FIG. 11, a tank discharge flow line 106 is shown which can be provided with a tank discharge valve 107. Tank discharge flow line 106 can be provided with a quick connect that forms a connection with the quick connect fitting 103 of FIG. 10. The swivel 98 enables movement of the quick connect fitting 103 as shown by arrows 104 in FIG. 10.

Each corner column 29-32 can be provided with a stacking fitting 110 which enables one cargo rack 10 to be stacked upon another cargo tank 10 as seen in FIG. 16. Each stacking fitting 110 can be connected to (e.g. welded) to a gusset or stiffener plate 111. Each stacking fitting 110 provides a horizontal and preferably rectangular plate 112 and two vertical plates 113, 114 which intersect at right angles and which extend upwardly from the periphery of plate 112.

Module receptacles 115 are provided for supporting each corner of a tank or module 105. Each receptacle 115 has a lower plate 116 and side, vertical plates 117, 118 as seen in FIGS. 1-5, 11, and 16. Each tank or module 105 has four feet 119, each foot 119 registering upon a module receptacle 115 as seen in FIG. 11.

Figure 8:
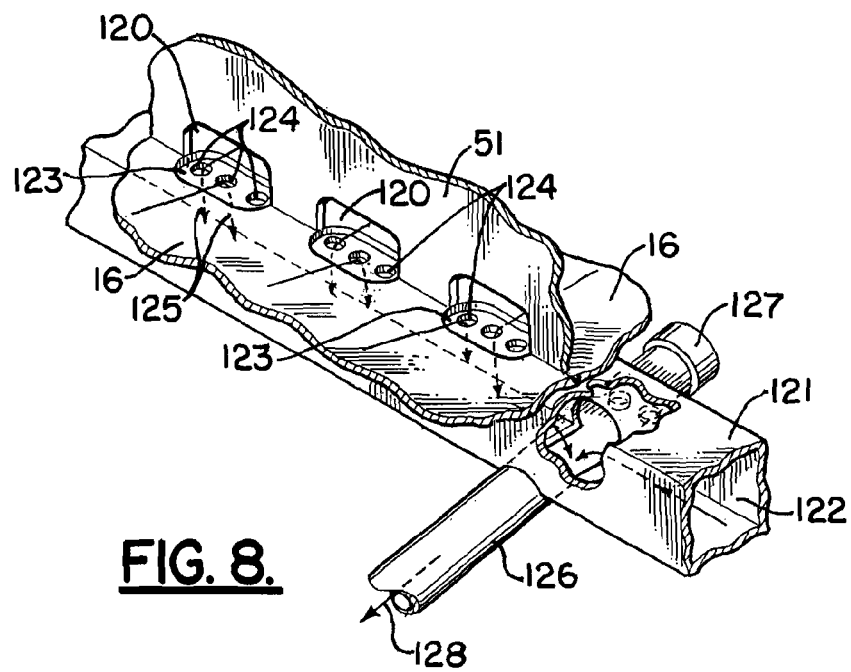
FIG. 8 is a fragmentary view of a preferred embodiment of the apparatus of the present invention.

A drain is provided for draining fluids from floor 16 such as might occur during a wash down or if there is leakage from one of the modules 105. Drain channel 121 is mounted just under floor 16 as seen in FIGS. 7-8. Drain channel 121 has flow bore 122. A plurality of floor openings 123 are provided, such as one of the openings 123 under each opening 120 as shown in FIG. 8. Drain channel inlet openings 124 are ports or openings in the channel 121 and are aligned with the floor openings 123. Arrows 125 in FIG. 8 illustrate the flow path of fluid that drains from floor 116 to channel 121 bore 122. Fluid received in channel 121 flows via gravity to drain pipe 126. Pipe 126 is closed at one end portion with cap 127. The other end portion of pipe 126 is fitted with valve 129. In FIG. 8, arrow 128 illustrates flow direction of fluid in pipe 126.

FIGS. 17-23 illustrate the doors 21-24 and the mechanism for opening or closing a door. While doors 21-22 are shown in FIGS. 17-23, the same configuration could be used for doors 23-24. Each door 21, 22 has a pair of vertical members. The door 21 has vertical members 130, 131. The door 22 has vertical members 132, 133. Horizontal members span between the vertical members of each door 21, 22 as shown. The door 21 has horizontal members 134 that span between vertical members 130, 131. Similarly, horizontal members 135 span between the vertical members 132, 133 of the door 22. The innermost vertical members 131, 133 are an assembly that includes vertical flanged members 140, 141, rods 138, 139, sleeves 142, 143 and other plates and guides that will be described more fully hereinafter.

Figure 17:
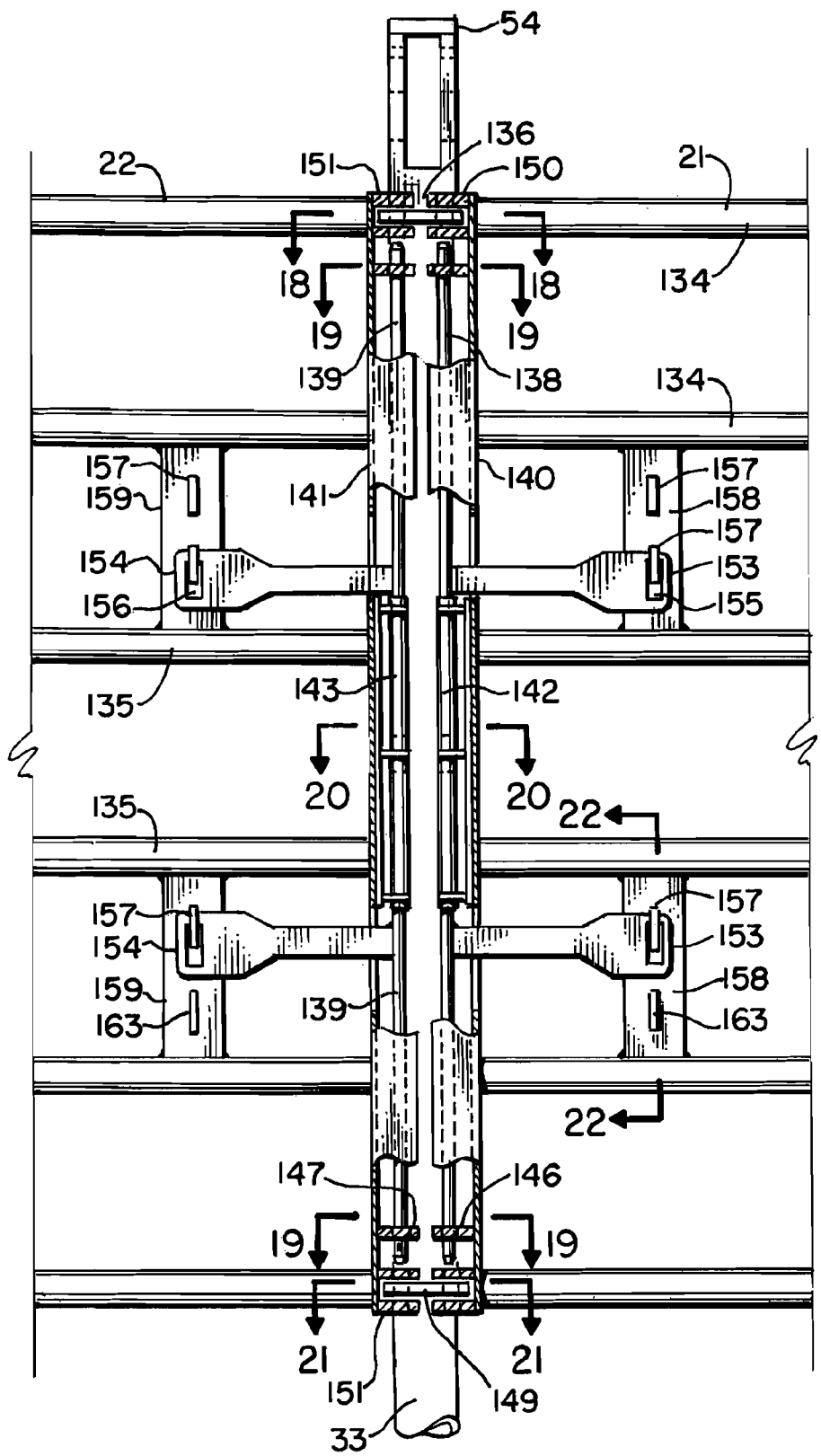
FIG. 17 is a fragmentary elevation view of a preferred embodiment of the apparatus of the present invention.

Each door 21, 22 can be opened or closed using levers 153, 154 which are attached to the rods 138, 139. Each rod 138, 139 is mounted in a sleeve and in rod guides. The rod 138 is able to move up and down while being supported by sleeve 142, upper rod guide 144, lower rod guide 146 while being moved up or down with a lever 153. In FIG. 17 there are two rods 138 associated with the door 21. It should be understood, that the door 21 as constructed can be used when inverted such as if for replacing one of the other doors.

Similarly, the door 22 has two rods 139, each rod having an attached lever 154. The rod 139 is supported by upper rod guides 145, lower rod guides 147 and sleeve 143. Each of the rod guides 144, 145, 146, 147 provides a rod opening 148 through which a rod 138 or 139 can pass. An upper plate 136 and a lower plate 149 are provided for locking a gate 21, 22 in a closed position when a rod 138, 139 is moved upwardly using a lever 153 or 154. In FIG. 17, all of the rods 138, 139 are in an open position. FIGS. 23 and 23 illustrate a movement of lever 153 from the open position of FIG. 17 to the closed position. In FIG. 23, the lever 153 is shown being moved to the closed position as indicated by arrows 161, 162.

Each of the upper and lower rod guides 144, 147 can be in the form of a horizontal flange 150 or 151.

The upper plate 136 has plate openings 137. Similarly, the lower plate 149 has lower plate openings 152.

Each lever 153, 154 has a lever opening for enabling the lever 153, 154 to be attached to a Tee shaped fitting 157. The lever 153 has lever opening 155. The lever 154 has lever opening 156. Each of the Tee fittings 157 is mounted to a vertical plate. For the door 21, the plate 158 carries two such Tee fittings 157 as shown in FIGS. 17-23. Similarly, for the door 22, the plate 159 carries two of the Tee fittings 157. For each door 21, 22 there are a pair of the plates 158 or 159 as shown in FIG. 17.

In order to lock the gate 21 or 22, the levers 153 or 154 move toward the upper plate 136 for the upper rods or toward the lower plate 149 for the lower rods. When the levers 153 or 154 are moved to the locking Tee fitting 163 as shown in FIGS. 23 and 23, the rods automatically interlock with the openings 137 of the upper plate or the openings 152 of the lower plate. The rods also pass through the rod openings 148 of the upper and lower rod guides 144-147.

The following is a list of suitable parts and materials for the various elements of a preferred embodiment of the present invention.

| PARTS LIST | |
|---|---|
| PART NO. | DESCRIPTION |
| 10 | cargo rack |
| 11 | frame |
| 12 | upper end portion |
| 13 | lower end portion |
| 14 | base |
| 15 | bottom |
| 16 | floor |
| 17 | floor segment/quadrant |
| 18 | floor segment/quadrant |
| 19 | floor segment/quadrant |
| 20 | floor segment/quadrant |
| 21 | gate/door |
| 22 | gate/door |
| 23 | gate/door |
| 24 | gate/door |
| 25 | hinge |
| 26 | hinge |
| 27 | hinge |
| 28 | hinge |
| 29 | corner column |
| 30 | corner column |
| 31 | corner column |
| 32 | corner column |
| 33 | intermediate column |
| 34 | intermediate column |
| 35 | intermediate column |
| 36 | intermediate column |
| 37 | upper interior horizontal support |
| 38 | upper interior horizontal support |
| 39 | upper interior horizontal support |
| 40 | upper interior horizontal support |
| 41 | central column |
| 42 | diagonal support |
| 43 | diagonal support |
| 44 | diagonal support |
| 45 | diagonal support |
| 46 | lower interior horizontal support |
| 47 | lower interior horizontal support |
| 48 | lower interior horizontal support |
| 49 | lower interior horizontal support |
| 50 | plate section |
| 51 | plate section |
| 52 | plate section |
| 53 | plate section |
| 54 | lifting assembly |
| 55 | lifting assembly |
| 56 | lifting assembly |
| 57 | lifting assembly |
| 58 | peripheral horizontal member |
| 59 | upper central fitting |
| 60 | lifting flock/body |
| 61 | side surface |
| 62 | side surface |
| 63 | front surface |
| 64 | rear surface |
| 65 | upper end portion |
| 66 | lower end portion |
| 67 | recess/slot |
| 68 | opening |
| 69 | pin |
| 70 | annular groove |
| 71 | plate |
| 72 | plate |
| 73 | opening |
| 74 | opening |
| 75 | bolt |
| 76 | opening |
| 77 | slot |
| 78 | cover plate |
| 79 | nut |
| 80 | sling/lift line |
| 81 | eyelet |
| 82 | lifting implement/hook/crown block |
| 83 | ring/shackle/lifting fitting |
| 84 | header/manifold |
| 85 | base interior |
| 86 | bottom panel |

PARTS LIST

| PART NO. | DESCRIPTION |
|---|---|
| 87 | beam |
| 88 | beam |
| 89 | opening/bore |
| 90 | opening/bore |
| 91 | discharge/outlet fitting/coupling |
| 92 | valve |
| 93 | valve handle |
| 94 | flow line |
| 95 | flow line |
| 96 | flow line |
| 97 | flow line |
| 98 | swivel |
| 99 | riser |
| 100 | elbow fitting |
| 101 | elbow fitting |
| 102 | hose section |
| 103 | quick connect fitting |
| 104 | arrow |
| 105 | tank/module |
| 106 | tank discharge flow line |
| 107 | tank discharge valve |
| 108 | arrow |
| 109 | Tee fitting - lock |
| 110 | stacking fitting |
| 111 | gusset/stiffener plate |
| 112 | horizontal plate |
| 113 | vertical plate |
| 114 | vertical plate |
| 115 | module receptacle |
| 116 | lower plate |
| 117 | vertical plate |
| 118 | vertical plate |
| 119 | tank/module foot |
| 120 | opening/slot |
| 121 | drain channel |
| 122 | flow bore |
| 123 | floor opening |
| 124 | drain channel inlet opening |
| 125 | arrow |
| 126 | drain flow pipe |
| 127 | cap |
| 128 | arrow |
| 129 | outlet valve |
| 130 | vertical member |
| 131 | vertical member |
| 132 | vertical member |
| 133 | vertical member |
| 134 | horizontal member |
| 135 | horizontal member |
| 136 | upper plate |
| 137 | upper plate opening |
| 138 | rod |
| 139 | rod |
| 140 | vertical flanged member |
| 141 | vertical flanged member |
| 142 | sleeve |
| 143 | sleeve |
| 144 | upper rod guide |
| 145 | upper rod guide |
| 146 | lower rod guide |
| 147 | lower rod guide |
| 148 | rod opening |
| 149 | lower plate |
| 150 | horizontal flange |
| 151 | horizontal flange |
| 152 | lower plate opening |
| 153 | lever |
| 154 | lever |
| 155 | lever opening |
| 156 | lever opening |
| 157 | Tee fitting - unlock |
| 158 | vertical plate |
| 159 | vertical plate |
| 160 | arrow |
| 161 | arrow |
| 162 | arrow |
| 163 | Tee fitting - lock |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A cargo rack comprising:
a) a frame having a front, a rear, and upper and lower end portions;
b) the lower end portion of the frame providing a base with a floor providing multiple load holding positions, each configured to hold a separate load module;
c) a plurality of load modules that are supported with the frame during use;
d) the frame including a plurality of side walls that attach to and extend upwardly from the base and including at least left and right side walls, the frame having four corners with a corner column at each corner;
e) at least one intermediate column positioned in between two corner columns;
f) multiple gates that are movably mounted to the frame, each gate spanning in a horizontal direction from a corner column to an intermediate column;
g) a plurality of lifting eyes attached to the upper end portion of the frame, each lifting eye attached to the frame next to an intermediate column; and
h) inner walls that separate the base into said load holding position, said inner walls spanning between intermediate columns to define a transverse support that is generally aligned with a pair of lifting eyes.

2. The cargo rack of claim 1 wherein there are four load holding positions.

3. The cargo rack of claim 1 wherein there are a pair of gates at the front of the frame.

4. The cargo rack of claim 1 wherein there are a pair of gates at the rear of the frame.

5. The cargo rack of claim 1 wherein the frame includes multiple perimeter beams.

6. The cargo rack of claim 5 wherein the floor attaches to an upper end portion of a said perimeter beam.

7. The cargo rack of claim 5 wherein there is a drain opening in the floor.

8. The cargo rack of claim 5 wherein the floor attaches to an upper end portion of a said perimeter beam.

9. The cargo rack of claim 1 further comprising clamps movably attached to the upper end portion of the frame between clamping and release positions for restraining vertical movement of a load that is placed on the floor.

10. The cargo rack of claim 1 further comprising raised portions that extend above the floor for providing a level surface to engage a load placed on a load holding position of the frame.

11. A cargo rack comprising:
a) a frame having a floor, a front, a rear, four corners, and upper and lower end portions;
b) each corner having a corner column;

c) a plurality of intermediate columns, each between two corner columns;
d) a plurality of load modules that are supported within the frame and upon the floor during use;
e) the frame including a plurality of side walls extending upwardly from a perimeter beam and including at least left and right side walls, the frame having four corners and a corner column at each corner;
f) a plurality of gates that are movably mounted on the frame, the gates enabling the load modules to be loaded laterally to the floor;
g) the frame floor providing a plurality of load holding positions, each load module occupying a load holding position;
h) wherein the gates expose a majority of the width of the floor for loading a load module to a selected load holding position on the floor;
i) inner walls that span between intermediate columns, each inner wall connecting to an intermediate column; and
j) lifting eyes aligned with a said inner wall and spaced between said corner columns.

12. The cargo rack of claim 11 wherein there are a pair of gates at the front of the frame.

13. The cargo rack of claim 11 wherein there are a pair of gates at the rear of the frame.

14. The cargo rack of claim 11 wherein the floor is inclined.

15. The cargo rack of claim 14 wherein there is a drain in the floor.

16. The cargo rack of claim 11 further comprising clamps movably attached to the upper end of the frame between clamping and release positions for holding restraining vertical movement of a load that is placed on the floor.

17. The cargo rack of claim 11 further comprising raised pedestals that extend above the floor for providing a level surface to engage a load placed on a load holding position of the frame.

18. The cargo rack of claim 11 wherein there are four load holding positions.

* * * * *